US007031850B2

(12) United States Patent
Kambli et al.

(10) Patent No.: US 7,031,850 B2
(45) Date of Patent: Apr. 18, 2006

(54) METHOD AND APPARATUS FOR DIAGNOSING LEAKAGE IN A FLUID POWER SYSTEM

(75) Inventors: Sachin Kambli, Lake Grove, NY (US); Jens Engelhardt, Esslingen (DE); Christian Boehm, Huntington, NY (US)

(73) Assignee: Festo AG & Co. KG, Esslingen (DE)

( * ) Notice: Subject to any disclaimer, the term of this patent is extended or adjusted under 35 U.S.C. 154(b) by 168 days.

(21) Appl. No.: 10/826,141

(22) Filed: Apr. 16, 2004

(65) Prior Publication Data

US 2005/0234660 A1 Oct. 20, 2005

(51) Int. Cl.
*G01F 17/00* (2006.01)
*G01F 23/00* (2006.01)
*G01L 7/00* (2006.01)
*G01N 11/00* (2006.01)
*G06F 19/00* (2006.01)

(52) U.S. Cl. ............................ 702/51; 702/33; 702/55; 702/282; 73/40; 700/281

(58) Field of Classification Search .................. 702/51
See application file for complete search history.

(56) References Cited

U.S. PATENT DOCUMENTS 4,734,869 A 3/1988 Mickowski
4,856,278 A 8/1989 Widmann et al.
4,862,385 A 8/1989 Fujita et al.
4,976,144 A 12/1990 Fitzgerald
4,985,857 A 1/1991 Bajpai et al.
5,067,099 A 11/1991 McCown et al.
5,081,599 A 1/1992 Saito
5,218,968 A 6/1993 Apple
RE34,559 E 3/1994 Mickowski
5,329,465 A 7/1994 Arcella et al.
5,343,737 A 9/1994 Baumoel
5,453,944 A 9/1995 Baumoel
5,471,400 A 11/1995 Smalley et al.
5,550,498 A 8/1996 Kwan et al.
5,594,663 A 1/1997 Messaros et al.
5,608,845 A 3/1997 Ohtsuka et al.

(Continued)

FOREIGN PATENT DOCUMENTS

DE 19628221 A1 4/1998

(Continued)

*Primary Examiner*—John Barlow
*Assistant Examiner*—Sujoy Kundu
(74) *Attorney, Agent, or Firm*—Hoffmann & Baron, LLP

(57) ABSTRACT

A method and apparatus of diagnosing leakage in a fluid power system including a fluid supply line operatively connected to a plurality of valves which are connected to a plurality of actuators. Flow signals generated by a flow sensor disposed in the supply line are processed to obtain fluid consumption over time values and signals used to change the state of the plurality of valves are processes to determine a plurality of episodes. Each of the plurality of episodes corresponds to a pressurization of a particular branch of a particular actuator. The flow signals and the signals used to change the state of the valves are combined to calculate a change in air consumption value for each valve change of state. The change in air consumption values for each episode are compared to a predetermined reference value to determine any deviation corresponding to a particular one of the plurality of episode. The one of the plurality of episodes and corresponding pressurized branch with the greatest deviation is identified. A signal is generated indicating both that a leak is present in the system and the branch responsible for the leak.

21 Claims, 6 Drawing Sheets

U.S. PATENT DOCUMENTS

| | | | |
|---|---|---|---|
| 5,628,229 | A | 5/1997 | Krone et al. |
| 5,642,278 | A | 6/1997 | Wang et al. |
| 5,801,964 | A | 9/1998 | McCarthy |
| 5,893,047 | A | 4/1999 | Gimblett et al. |
| 6,246,972 | B1 | 6/2001 | Klimasauskas |
| 6,282,463 | B1 | 8/2001 | Oneyama et al. |
| 6,292,757 | B1 | 9/2001 | Flanagan et al. |
| 6,308,138 | B1 | 10/2001 | Jones et al. |
| 6,405,108 | B1 | 6/2002 | Patel et al. |
| 6,425,247 | B1 | 7/2002 | Schmid |
| 6,542,853 | B1 | 4/2003 | Murakami et al. |
| 6,711,507 | B1 | 3/2004 | Koshinaka et al. |
| 2003/0125841 | A1 * | 7/2003 | Schlosser .................... 700/282 |

FOREIGN PATENT DOCUMENTS

| | | | |
|---|---|---|---|
| DE | 100 52 664 | A1 | 5/2002 |
| DE | 10052664 | A1 | 5/2002 |
| EP | 0534 506 | A2 | 3/1993 |
| EP | 0 587 902 | A1 | 3/1994 |
| EP | 0740805 | | 7/1995 |
| EP | 0 850 363 | B1 | 7/1998 |

* cited by examiner

METHOD AND APPARATUS FOR DIAGNOSING LEAKAGE IN A FLUID POWER SYSTEM

FIELD OF INVENTION

The invention relates to a method and apparatus for detecting leaks in a fluid power system, and more specifically for detecting the existence and location of leaks within a fluid power system.

BACKGROUND OF THE INVENTION

In the manufacturing environment, fluid power systems are typically used to automate machines, transport materials, and/or control processes. Such systems typically include a plurality of actuators that are operatively connected to valves. The actuators are connected to the valves by a series of tubing and fittings. The valves may be controlled by a number of devices such as microprocessors or programmable logic controllers or through analog control circuits. The fluid power systems typically run on compressed fluid such as air or hydraulic oil.

During the use of fluid power components, it is almost inevitable that leakage will occur somewhere in the system. One common area of leakage is between the actuators and the valves. Such leakage can occur by failure of the tubing, for example, by exposure to corrosive substances, abrasion as the tubing moves along with an actuator, or the tubing may inadvertently being pinched during the manufacturing process. In addition, fittings which attach the tubing to the valves and actuators can become loose and permit leakage from the valve ports and/or cylinder ports.

Such leakage is undesirable and can have various deleterious effects. For example, in pneumatic systems the pressurized air is provided by compressors which are expensive to operate. Accordingly, even small leaks in a system left unattended, can lead to significant increase in operating costs for the system. In addition, when pneumatic systems are used in environments where the condition of the ambient air is required to stay clean, unwanted air leakage can also lead to contamination and maintenance issues. In the case of hydraulic systems, leaks will spill hydraulic oil out of the lines leading to contamination of the surrounding area. While these leaks may be more easy to identify than in a pneumatic system, if left untreated, they can create significant maintenance issues. In addition, leaks can affect actuator performance and the overall performance of the equipment. Accordingly, it is desirable to eliminate and detect the presence of leaks as soon as possible.

Leaks are typically diagnosed in pneumatic systems by listening for the sound of hissing air and by periodically inspecting tubes and tightening fittings which may be susceptible to loosening. Such inspections are time consuming and may be difficult to perform in a noisy industrial environment. Hydraulic system leaks which result in the spillage of hydraulic oil can be seen, however, such leaks would only be uncovered if they are in an area where an operator can view the leak. Such inspection methods will often miss small leaks and prevent maintenance from being done early on in a leakage event before any problems occur.

It is known in the prior art to use various sensors in order to detect leaks in a fluid power system. Such methods include using a multitude of sensors, for example, one for each actuator, in order to see changes in air flow for a particular actuator. Methods relying on a multitude of sensors, however, require significant processing power and increase complexity.

Accordingly, it would be desirable to provide a method and apparatus for detecting leakage in a fluid power system in an automated manner without the need for excessive components.

SUMMARY OF THE INVENTION

It is an advantage of the present invention to provide a method and apparatus for detecting leakage in a fluid power system.

It is another advantage of the present invention to provide a method and apparatus for detecting the existence of a leak in a fluid power system and identify the location of the leak.

It an other advantage of the present invention to provide a method and apparatus for detecting the existence of a leak in a fluid power system and identify the location of the leak based on information provided by a flow sensor positioned in a line supplying pressurized fluid to a plurality of valves and signals used to shift the valves.

In the efficient attainment of these and other advantages the present invention includes a method of diagnosing leakage in a fluid power system including a fluid supply line operatively connected to a plurality of valves which are connected to a plurality of actuators.

The method includes the steps of: processing flow signals generated by a flow sensor disposed in the supply line to obtain fluid consumption over time; processing signals used to change the state of the plurality of valves to determine a plurality of episodes, each of the plurality of episodes corresponding to a pressurization of a particular branch of a particular actuator. The method further includes the steps of combining the flow signals with the signals used to change the state of the valves to calculate a change in air consumption value, ΔFC, for each valve change of state. The ΔFC values for each episode are compared to a predetermined reference number to determine deviation corresponding to a particular one of the plurality of episodes. The one of the plurality of episodes with the greatest deviation is identified and a signal indicating that a leak is present in the system and indicating the corresponding branch responsible for the leak is generated.

The present invention also provides a method for diagnosing an increase in fluid consumption in a fluid power system including a fluid supply line operatively connected to a plurality of valves which are each connected to a corresponding actuator by at least one branch, the at least one branch of each actuator being selectively pressurized and exhausted by the corresponding valves, the method comprising the steps of:

(a) sensing a fluid flow through the supply line and calculating fluid consumption over a predetermined period of time;

(b) defining a plurality of episodes wherein each episode corresponds to a time period when the at least one branch of one of the plurality of actuators is pressurized;

(c) calculating a change in fluid consumption for each episode to obtain a change in fluid consumption value, ΔFC, for the at least one branch of each of the plurality of actuators;

(d) comparing the ΔFC values to a predetermined reference fluid consumption value for each of the at least one branch of each of the plurality of actuators during a system cycle to obtain a deviation value for each at least one branch of each of the plurality of actuators;

(e) in response to the actuator having a plurality of branches, calculating the difference between the deviation value of each of the plurality of branches of the actuator to obtain an actuator deviation value for each of the plurality of actuators;

(f) in response to the actuator having only one branch, the deviation value for the one branch equals the actuator deviation value;

(g) comparing the actuator deviation values for each actuator to determine which of the plurality of actuators has the highest deviation value;

(h) in response to the actuator having the highest deviation value having only one branch, generating a signal indicating that the one branch has an increase leak in fluid consumption;

(i) in response to the actuator having a plurality of branches comparing the deviation values for the branches of the actuator with the highest deviation value to determine which branch has the highest deviation value; and (j) generating a signal indicating that the branch with the highest deviation value has an increase leak in fluid consumption.

In a preferred embodiment, the ΔFC value for each episode is calculated by mathematically differentiating the air consumption over the time duration of the episode. In addition, after step (a) and before step (c) further including the steps of;

calculating a current total air consumption value for a system cycle;

comparing the current total air consumption value to a reference total air consumption value to obtain a difference value, if the difference value exceeds a predetermined amount, then continue to step (c), if the difference value is less than a predetermined amount then go to step (a).

The ΔFC value for each episode may be determined by calculating the slope value of a line plotting fluid consumption over time. The slope value corresponding to each episode is calculated by obtaining an air consumption average Y1 over a first predetermined portion of a beginning of an episode and obtaining an air consumption average Y2 over a second predetermined portion of an end of the episode and dividing the difference between Y2 and Y1 by the total time of the episode. The first and second predetermined portions may be selectable by a user. Alternatively, the first and second predetermined portions may be determined by the monitoring device and are calculated as a percentage of a total length of the episode. The method may further include a step where in response to a condition where all the deviation values for each branch and each actuator exceeds a predetermined value, generating a signal indicating that there is a leak in the supply line.

The present invention may further provide an apparatus for diagnosing leakage in a fluid power system including a fluid supply line operatively connected to a plurality of valves which are each connected to a corresponding actuator by a first and second branch, the first and second branches of each actuator being selectively pressurized and depressurized by the corresponding valves. The apparatus may include a flow sensor disposed in the fluid supply line for sensing fluid flow to the plurality of valves and a monitoring device operatively connected to the flow sensor, the monitoring device including a processor and memory. A valve controller may be operatively connected to each of the plurality of valves and operatively connected to the monitoring device. The valve controller generates signals to cause the plurality of valves to shift. The monitoring device defines a plurality of episodes wherein each episode corresponds to a time period when one branch of one of the plurality of actuators is pressurized. The monitoring device calculates a change in fluid consumption values, ΔFC, from signals received from the flow sensor. The monitoring device may also calculate a ΔFC value for each episode to obtain a ΔFC value for each branch and compares the ΔFC value to a predetermined reference value for each of the branches of each of the plurality of actuators during a system cycle to obtain a deviation value for the first and second branch. For each actuator, the monitoring device obtains the difference between the deviation value of the first and second branches to obtain an actuator deviation value, and compares the actuator deviation values for each actuator to determine which of the plurality of actuators has the highest deviation value. For the actuator with the highest deviation value, the monitoring device compares the fluid consumption values for first and second branches to determine which branch has the highest fluid consumption value, and generates a signal indicating that the branch with the highest fluid consumption value has a leak.

DETAILED DESCRIPTION OF THE PREFERRED EMBODIMENTS

Figure 1:
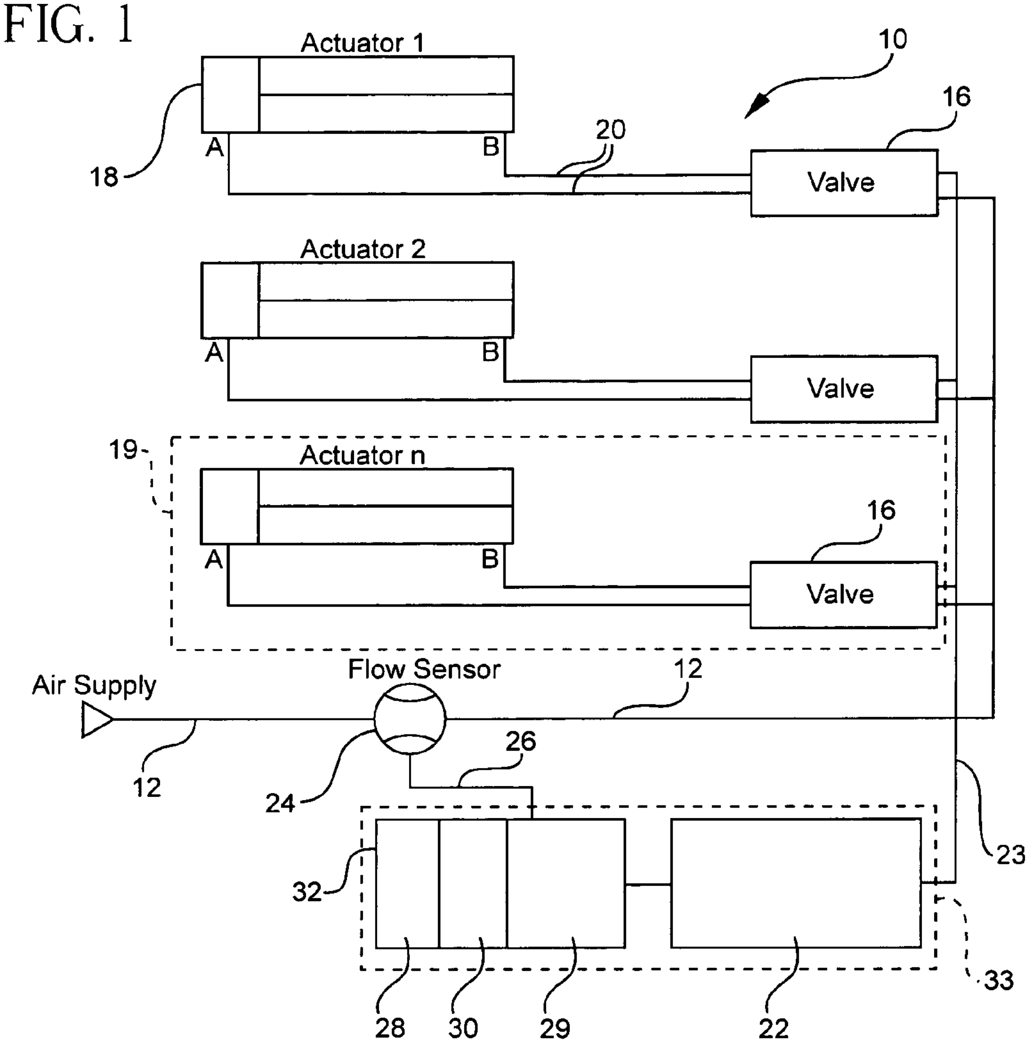
FIG. 1 is a schematic representation of a fluid power system of the present invention.

The present invention is directed to a method and apparatus for determining if a leak has occurred in a cyclic fluid power system and also for identifying the location of the leak. The present invention may be used in conjunction with a standard fluid power system which comprises a series of valves and actuators. As shown in FIG. 1, a fluid power system 10 formed in accordance with the present invention includes a supply line 12 providing pressurized fluid, which is operatively connected to one or more valves 16. Each valve 16 is connected to a corresponding actuator 18 forming a sub-system 19. In the preferred embodiment, air is the pressurized fluid, although other fluids such as hydraulic oil or the like could be used.

The valves and actuators are of a type well known in the art and may be employed in a variety of applications to operate a machine or control a process during manufacturing. The actuators 18 may be one of a variety of components including, for example, double-acting or single-acting linear or rotary drives. The actuators are connected to the valves through a fluid conduit 20, such as plastic or metallic tubing. A double-acting actuator has driven movement in two directions, and therefore, is connected to the valve by two separate fluid supplying conduits and their associated fittings which form branches A and B in a manner well known in the art. The valve typically has two states or positions, and two outputs. One output 13 connected via a branch to one cylinder port and the second output is connected by another branch to the second port of the cylinder. Alternatively, two separate valves can be used to drive a double acting cylinder, with one valve connected to one cylinder port and the other valve connected to the other cylinder port. In a typical fluid power system, a double-acting cylinder is connected by tubing to a valve. As the valve shifts state, the first output port and branch A are energized and the other port and branch B are depressurized or exhausted. When the valve is shifted back, the second output port and corresponding branch is pressurized and the first port and its corresponding branch is exhausted. Accordingly, at least one branch for each cylinder is typically always pressurized. For a single-acting cylinder, only one cylinder port is present and the actuator is returned to an initial state by a biasing force such as a spring.

The signal to cause the valves 16 to change state may be generated from a valve controller 22 such as a programmable logic controller (PLC), PC, or any other processor device. The PLC signal may be sent directly to the valve or fed over an electronic field bus to a valve module which would in turn be connected to the valves in a manner well known in the art.

During operation of the system, it will eventually develop leakage, for example, due to wear in components and loosening of connection fittings. One typical leak area is due to a failure in the tubing which may be caused by abrasion or pinching of the line when a system is operated. This is especially true when an actuator is positioned on a moving structure, and therefore the branch lines to the actuator also move subjecting them to wear. Corrosive materials resulting from certain manufacturing processes can also come in contact with the tubing leading to its failure. Another common leakage area is at the fittings which connect the tubing to the valves at one end and the actuator at the other end. This connection point is prone to leakage when the actuator moves. The present invention is particularly suited for detecting leaks in the tubing and/or fittings between the valve and the actuator which form the branches of the fluid power system.

Figure 2:
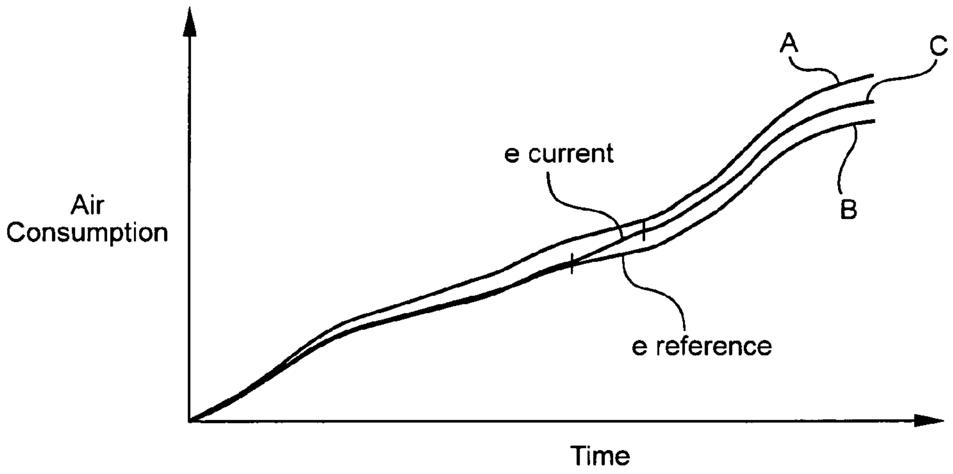
FIG. 2 is a graphical representation of air consumption vs. time for three system cycles.

In order to detect fluid leakage in the system or any of its sub-systems, the present invention includes a flow sensor 24 disposed in the supply line 12 which feeds each of the valves 16 in the system. The position of the flow sensor 24 in the fluid circuit permits the total amount of fluid consumed by the system to be determined. The flow sensor 24 generates an output signal 26 which is fed into a monitoring device 28. The output signal of the flow sensor may be mathematically integrated by the monitoring device 28 to determine the amount of air consumed over time. The movement of an actuator consumes air and therefore such movement is reflected in the total air consumption. A set of typical air consumption curves are set forth in FIG. 2. The air consumption curve also contains information about leaks in the system. If a leak is occurring in the supply line, then the air consumption curve A will continuously reflect a greater air consumption than the same curve for a leak-free system B. If, however, as reflected in curve C, the leak occurs only when one particular branch of an actuator is pressurized, the slope of the line during this episode, $e_{current}$, will show a noticeable increase over the slope of a reference curve for the same episode, $e_{reference}$, where there was no leakage. Accordingly, the slope of the air consumption curve is useful in determining leakage in a system and also in determining where in the system the leak is occurring.

The monitoring device 28 is also operatively connected to the valve controller 22. The valve controller 22 generates a signal 23 each time a valve is switched and this signal is sent to the monitoring device which has an input device 29 for receiving the signal. Accordingly, the monitoring device has information as to the fluid flow and the condition of each of the valves 16 during the cycle of the system. Information for proceeding cycles is stored by the monitoring device and analyzed. The monitoring device 28 may include a programmable microprocessor 30 and memory 32 for storing data. The monitoring device may be in the form of a computer, personal computer or dedicated hardware device. The monitoring device 28 and valve controller 22 may be separate components, or in an alternative embodiment the functions of these devices may be performed by a single processing unit 33.

Figure 3:
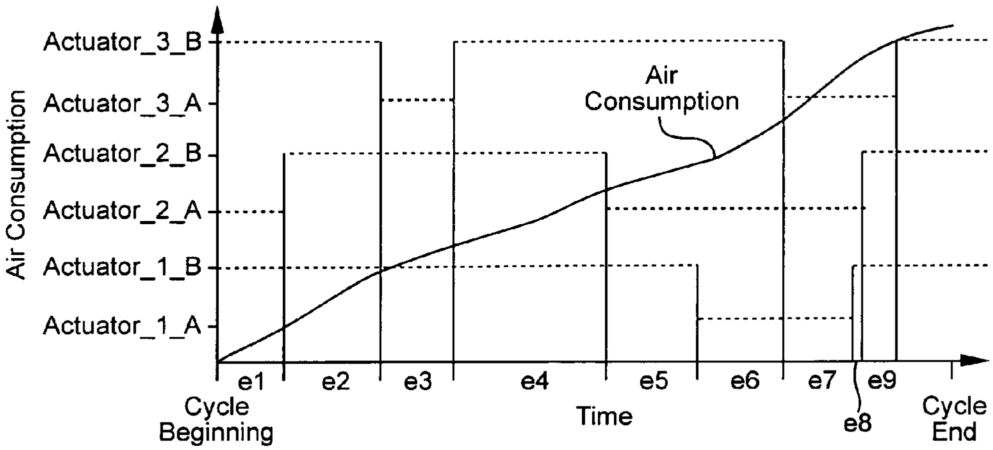
FIG. 3 is a graphical representation of episodes for a cycle of a fluid power system.
Figure 9A:
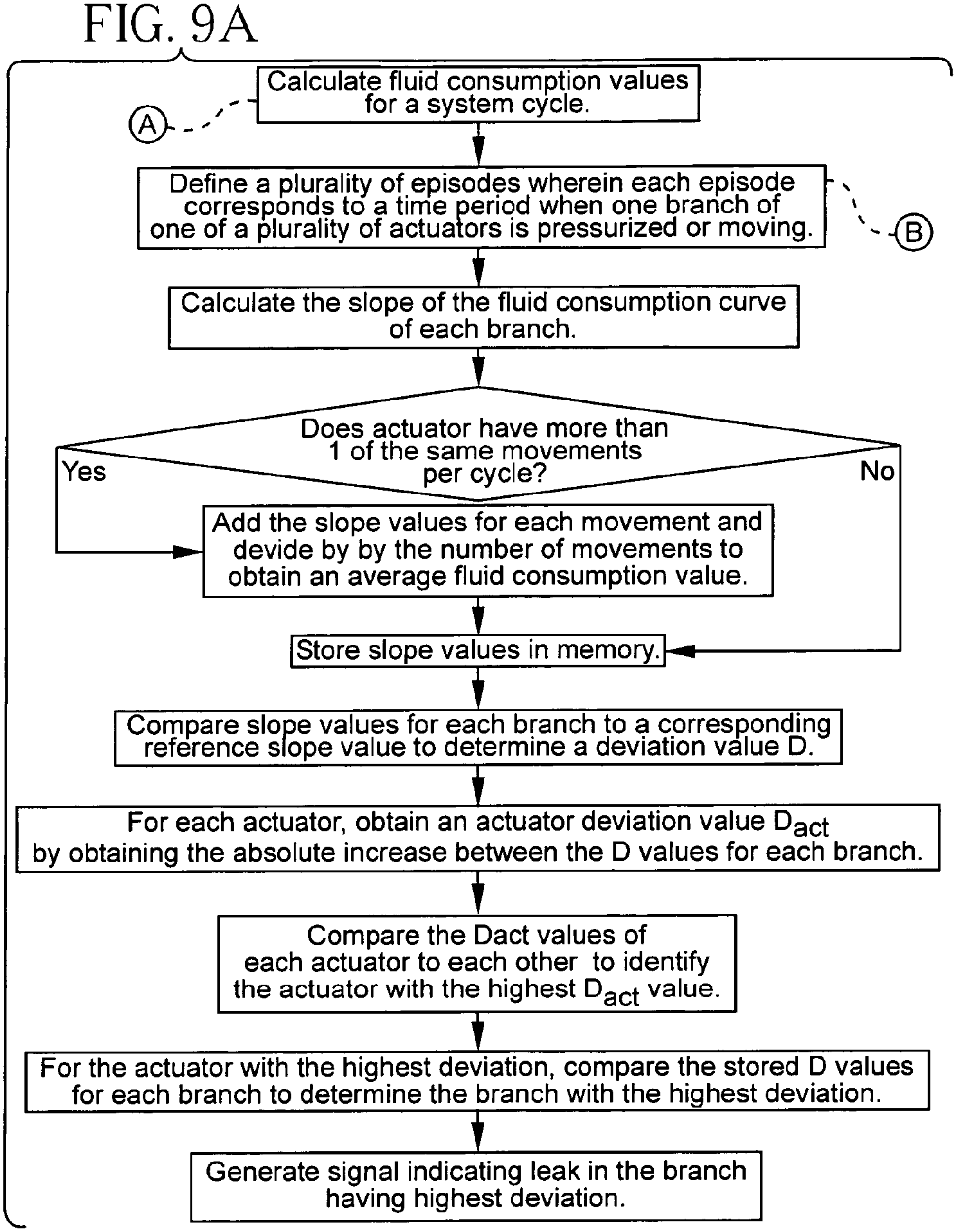
FIG. 9A is a flow chart of the method steps of the present invention.

With reference to FIG. 3 and the flow chart of FIG. 9A, in order to determine if a leak is occurring and are located in the system, the present invention, based upon the information provided by the sensor 24, calculates the fluid consumption values for a system cycle. A system cycle may be defined as either a total number of actuator movements, a total number of branch pressurizations, or a length of time. For example, if a system consists of two actuators and 4 branches, and each cylinder extends and retracts, this would include 4 separate cylinder movements, therefore the cycle could be defined as 4 movements and at the end of 4 movements a new cycle begins. Similarly, 4 branch pressurizations may define the cycle and after 4 branch pressurizations a new cycle would begin. If the action takes a total of 20 seconds then a cycle may be defined by a period of 20 seconds. The cycle is then segmented into a number of episodes, $e_n$, with each episode being marked by a shifting or change of state of one of the valves. One manner of determining an episode is when a certain valve is switched which causes one of the branch lines to be pressurized. The episode would end when the same valve is again switched to depressurize or exhaust the branch line. An alternative preferred manner of determining an episode is from the time of switching a valve which causes a branch line to be pressurized and ends with the next valve switch of any of the other valves in the system. In both manners of determining an episode, each episode results in a particular branch line, A or B, being pressurized. By segmenting the cycle into the pressurization of discrete branch lines, the ability to isolate a leak when a particular branch line is pressurized becomes possible.

In the present invention, the information regarding the episodes in the cycle is used in conjunction with the air consumption values to determine leakage. As shown in FIG. 3, the episode information is combined with the air consumption data. Over the duration of any episode the amount of air consumed will increase as an actuator is pressurized and moves. The rate of change of air consumption may be calculated for each episode. This value corresponds to the slope of the air consumption vs. time from the beginning to the end of the episode. The greater the slope value, the greater the amount of air consumed. Since each episode corresponds to a particular branch line being pressurized, this slope value for an episode is associated with a particular branch line.

During operation, the monitoring device 28 may determine the rate of change of air consumption for each episode in the cycle to detect a leakage condition. In the preferred embodiment, this is achieved by calculating a value corresponding to a change in the fluid consumption, ΔFC value. In the preferred embodiment, the change in the fluid consumption value may be the slope of the air consumption curve for every episode in the cycle. The slope can be obtained by differentiating an air consumption value over time which is equal to the change in air consumption divided by the length of the episode, i.e., Δair consumption/Δtime. Since air consumption is subject to minor fluctuations, the present invention determines the slope value of the air consumption curve which smoothes out fluctuations and provides a more reliable value to work with. The information as to when an episode begins is preferably determined by a signal generated by the valve controller 22. As shown in FIG. 3, an episode, e, begins with the shift of a valve 16 which will result in the movement of one of the actuators 18, and ends with the next valve shift signal to any valve in the system.

Figure 4:
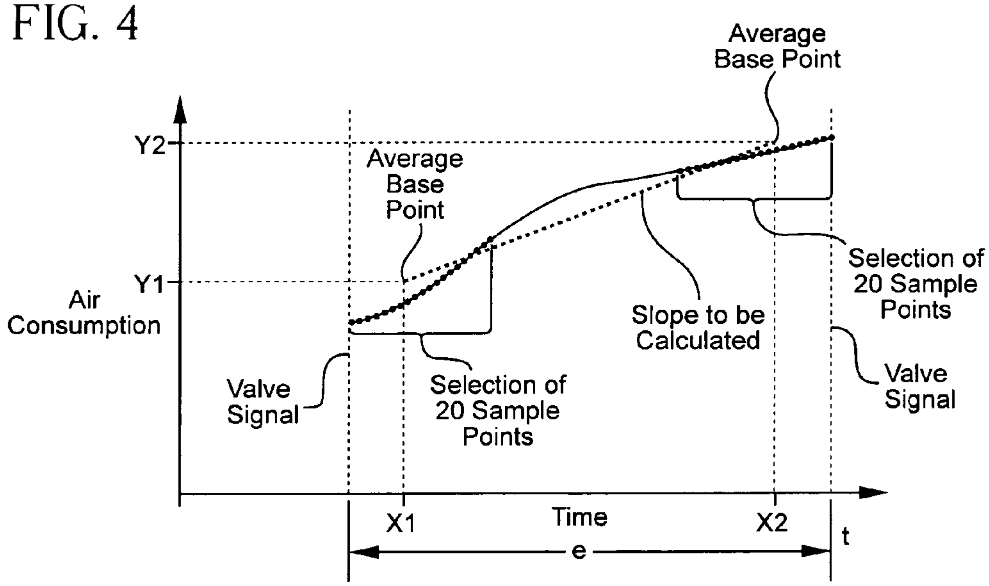
FIG. 4 is a detailed graphical representation of a single episode of a system cycle.

Referring to FIG. 4, in the preferred embodiment, in order to calculate the slope value for each episode, e, the initial air consumption value and a final air consumption value must be determined. The beginning and end of an episode correspond to a valve shift, and this valve shifting causes fluctuations in the air consumption. In order to compensate for such fluctuations, the initial and final air consumptions values are preferably an average calculated over a predetermined portion of the episode. In the preferred embodiment, air consumption data is calculated at various points along an episode. The initial and final air consumption values are calculated using a number of sampled data points from the beginning of the episode and a number of sampled data points from the end of the episode. The number of data points can be selected by a user or determined by the monitoring device. The number can be a fixed number of points or it can vary in relation to the length of the episode. In the present example, a sample of 20 data points is used for illustration purposes. By limiting the number of data points, demand on the processor can be reduced, while still providing sufficiently accurate information. The initial 20 air consumption values are summed and divided by the number of samples, 20, to obtain an initial averaged base value Y1.

$$Y1 = \frac{Y_1 + Y_2 + \ldots + Y_n}{n} \quad X1 = \frac{X_1 + X_2 + \ldots + X_n}{n}$$

The same averaging calculation is performed on the final data points to obtain a final averaged base Y2.

$$Y2 = \frac{Y_1' + Y_2' + \ldots + Y_n'}{n} \quad X2 = \frac{X_1' + X_2' + \ldots + X_n'}{n}$$

The absolute difference between values $Y_1$ and $Y_2$ is then obtained and that value is divided by the total time of the episode to determine an average slope for the episode.

$$\text{Slope} = \frac{Y2 - Y1}{X2 - X1}$$

The total time value corresponds to the total number of data samples during the episode, therefore, the difference between $Y_1$ and $Y_2$ can be divided by the total number of data samples to determine the current slope.

The slope value for that episode and cycle, referred to as the current slope value, would then be stored. This calculation process is repeated for each of the episodes in the cycle.

If a particular actuator has more than one of the same movements during a cycle, e.g., an actuator extends and retracts twice, then the slope values corresponding to that movement may be added and divided by the number of movements to obtain an average. Therefore, every branch has one calculated slope value per cycle.

Figure 5:
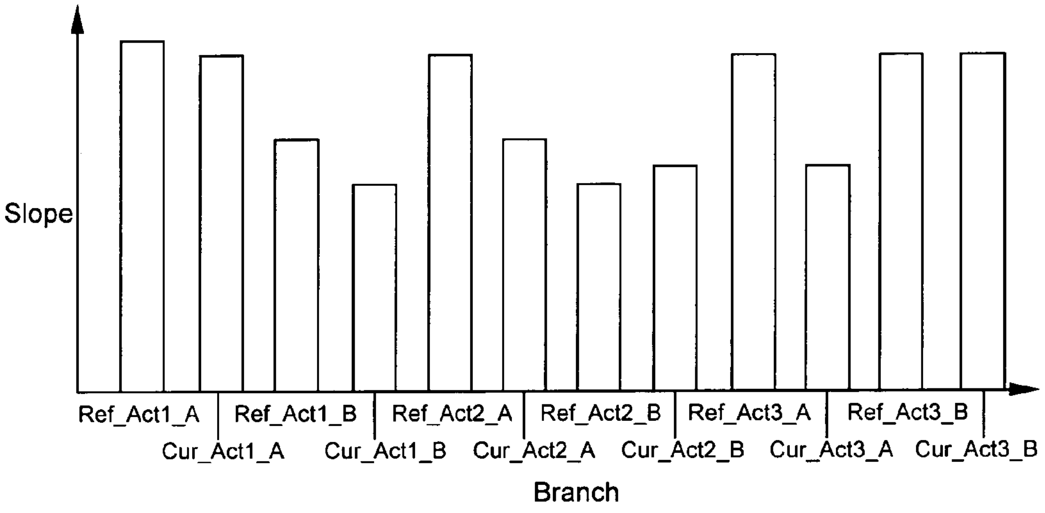
FIG. 5 is a bar chart comparing the air consumption slope value of each actuator branch and a corresponding reference value.

The calculated current slope values for each branch are then compared to a reference value corresponding to that particular branch under reference conditions. The comparison between reference slopes, $Ref\_Act_n$-, and current slopes, $Cur\_Act_n$_, of each single branch in a pneumatic system is shown in FIG. 5. These reference slope values are calculated in the same manner as that described above to determine the current slope values. However, the reference values are calculated at a time when the system is free of leaks. In the preferred embodiment, once a system has been set up and an installer ensures that it is leak free and running properly, the monitoring device can be placed in a test mode and test cycles can be run to determine the reference slope values for each episode. Preferably, several test cycles are run and an average reference slope value is obtained. This minimizes the effect of any anomalies, thereby establishing an accurate reference value for each branch of an actuator.

Figure 6:
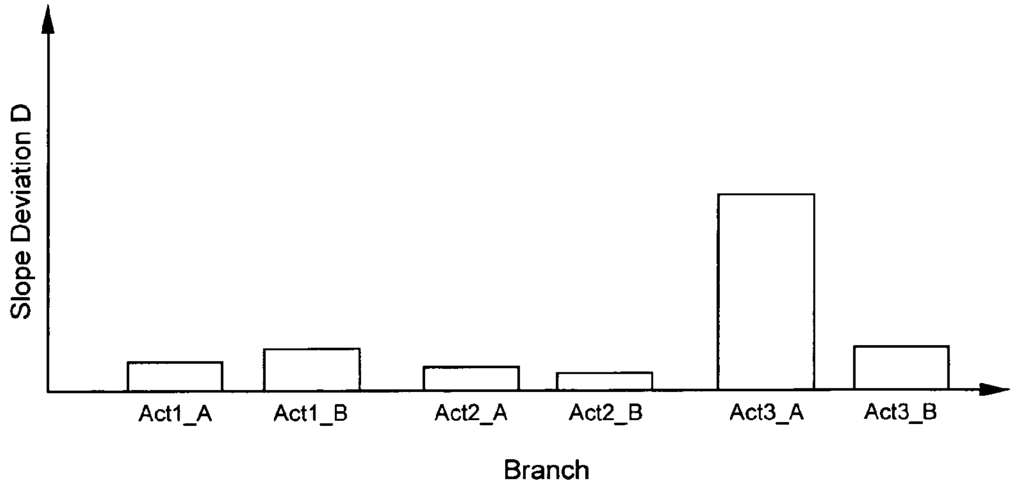
FIG. 6 is a bar chart showing, for each actuator in the system, the deviation D of the slope value from the corresponding reference value.

Referring to FIG. 6, the current slope values, $Cur\_Act_n$, for each branch are compared to corresponding reference value, $Ref\_Act_n$, to obtain a difference or deviation value D which is stored in the memory.

$$Cur\_Act_n - Ref\_Act_n = D$$

Figure 7:
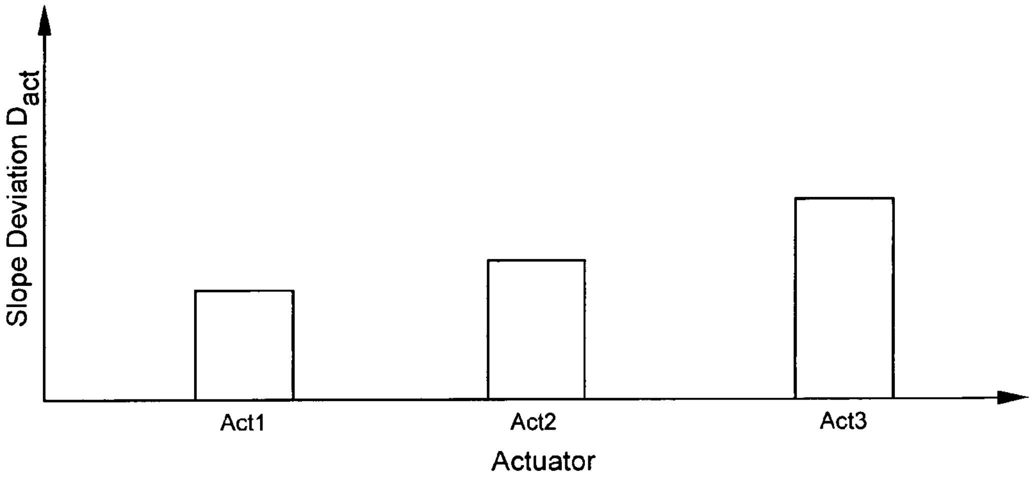
FIG. 7 is a bar chart showing, for each actuator in a system, the absolute difference between the deviation values of each branch of an actuator.

For double-acting actuators, which have two branches, the deviation values for the two branches A and B for each actuator are then subtracted from each other to obtain an absolute actuator deviation value, $D_{act}$. A graphical representation of $D_{act}$ is set forth in FIG. 7. For single-acting actuators, the deviation value D equals the $D_{act}$.

Figure 8:
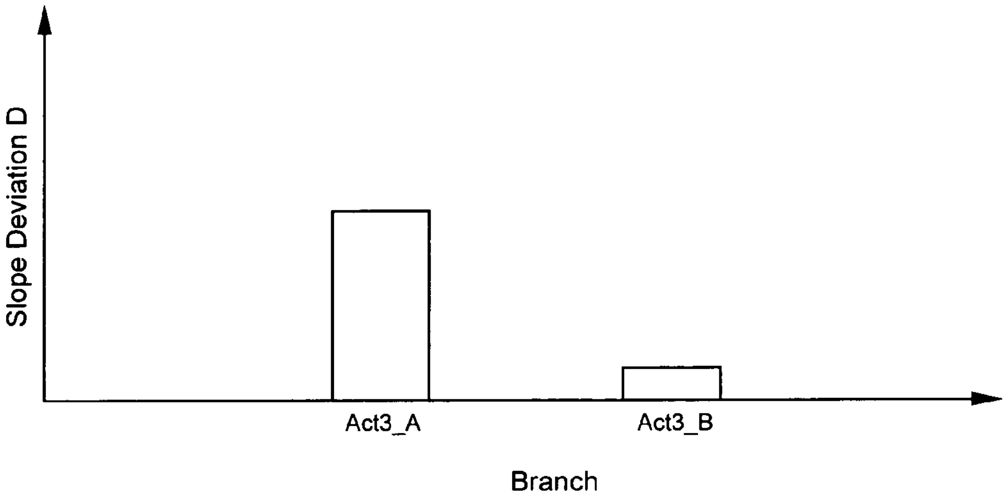
FIG. 8 is a bar chart showing the deviation between branches of a leaking actuator.

The processor compares the $D_{act}$ values for each of the actuators to each other and identifies the actuator with the greatest deviation. In a leak condition, one of the actuators, in this example actuator 3, will have a deviation significantly greater than the other actuators in the system as evidenced in FIG. 7. This information will indicate which actuator/valve combination is experiencing a leak. A signal could be generated at this point alerting an operator to the leaking actuator/valve combination. However, in the preferred embodiment the location of the leak is also determined as follows. Next, the processor recalls the deviation value D for each of the branches of the identified actuator. The D values for each branch are compared, FIG. 8, and the branch with the greatest deviation is identified as the branch having the leak. In the present example, branch A of actuator 3 has the greatest deviation. The monitoring device 28 may then generate an indication to alert an operator that a leak is occurring and where in the system the leak is located. The indication may be in one of any number of forms, for example, visual, audible or both. If the actuator with the highest deviation value has only one branch, then the signal indicating that the leak is in this branch would be generated without the need to compare branch deviations.

Figure 9B:
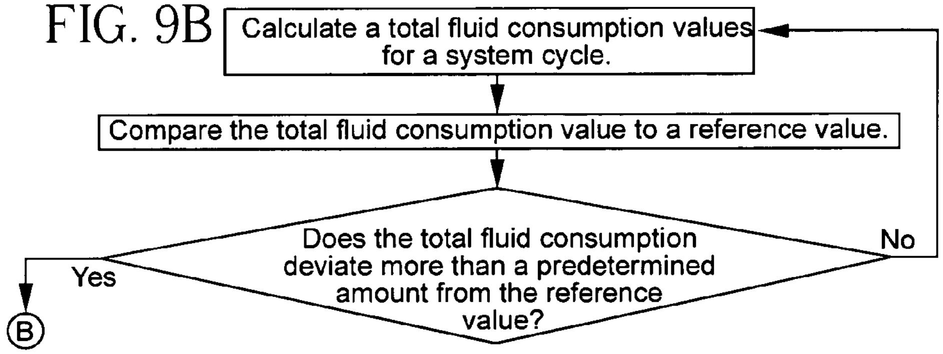
FIG. 9B is a flow chart of alternative steps to those set forth in FIG. 9A.

As the fluid power system 10 cycles over a period of time, the amount of air consumed during each cycle is calculated in monitoring device 28. During each cycle the movement of the actuators are the same, even if the order of the movements may vary. Therefore, the amount of fluid consumed per cycle should remain essentially the same for each cycle if the system is free of leaks. However, if the fluid consumption for a cycle is greater than in prior cycles, this indicates that a leak is occurring in the system. Referring additionally to FIG. 9B, in an alternative embodiment of the present invention, at the end of each cycle, the calculated fluid consumption is totaled and the total fluid consumption for the cycle may be compared to a reference total fluid consumption value. The reference fluid consumption value can be determined and stored by the monitoring device during test cycling of the system when the user is certain that the system is free of leaks. If the actual total fluid consumption value for a cycle deviates from the reference value by a predetermined amount or falls outside a predetermined range, then a leakage or fault condition exists. The present invention then proceeds to identify the particular actuator branch which is leaking by performing the steps described above and shown in FIG. 9A.

The present invention is capable of identifying leaks as the system goes through its ordinary operation. Only when a leak is detected and maintenance is to be performed does the operation of the system have to be interrupted. In addition, by identifying a particular branch which is leaking, the present invention keeps the maintenance time to a minimum, thereby permitting the system to quickly return to operation.

In an alternative embodiment, one other set of conditions that the processor of the monitoring device may be programmed to recognize is when all branches show an increase in slope value throughout the cycle beyond a predetermined value, this may indicate that there is a leak in the supply line or the fitting associated therewith. If such a condition exists, then a signal may be generated indicated that there is a leak in the supply line.

Figure 10:
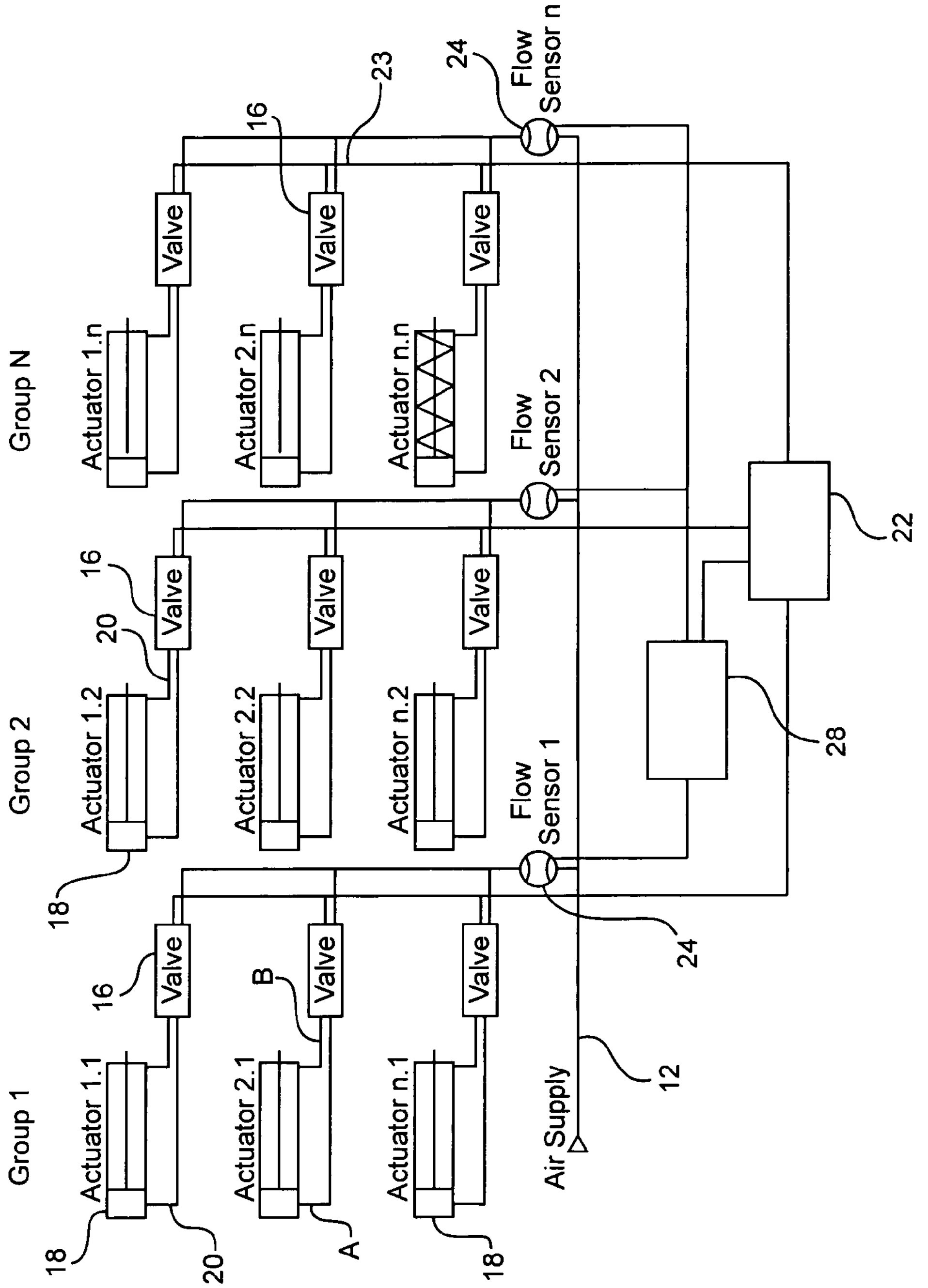
FIG. 10 is a schematic representation of a fluid power system of the present invention including a plurality of subsystems.

As shown in FIG. 10, the present invention may also be employed in systems including a plurality of actuators which are divided into separate groups. Each group may include a separate flow sensor 24, however, they may share the same monitoring device 28 and valve controller 24. In this multi-group embodiment, the leakage is diagnosed for each group in the same way as for a single group system described above.

A further alternative contemplated by the present invention is that a single system could be divided for diagnostic purposes into separate groups. Groups could be used to separate the actuators that have simultaneous movement. Therefore, each group will only have sequential movement and no simultaneous movements.

It is also contemplated that the present invention may be used in applications where there is simultaneous actuator movement during the cycle. In this application, by calculating an air consumption value for each flow and comparing this value to a reference value, a determination can be made that there is a leakage in the system. An operator could then investigate the various components to determine the location of the leak.

While there have been described what is presently believed to be the preferred embodiments to the invention, those skilled in the art will realize that various changes and modifications may be made to the invention without departing from the scope of the invention, and it is intended to claim all such changes and modifications as fall within the true scope of the invention.

What is claimed is:

1. A method for diagnosing an increase in fluid consumption in a fluid power system including a fluid supply line operatively connected to a plurality of valves which are each connected to a corresponding actuator by at least one branch, the at least one branch of each actuator being selectively pressurized and exhausted by the corresponding valves, the method comprising the steps of:

(a) sensing a fluid flow through the supply line and calculating fluid consumption values during a system cycle;

(b) defining a plurality of episodes wherein each episode corresponds to a time period when the at least one branch of one of the plurality of actuators is pressurized;

(c) calculating a change in fluid consumption for each episode to obtain a change in fluid consumption value, ΔFC, for the at least one branch of each of the plurality of actuators;

(d) comparing the ΔFC values to a predetermined reference fluid consumption value for each of the at least one branch of each of the plurality of actuators during a system cycle to obtain a deviation value for the at least one branch of each of the plurality of actuators;

(e) in response to the actuator having a plurality of branches, calculating the difference between the deviation value of each of the plurality of branches of the actuator to obtain an actuator deviation value for each of the plurality of actuators;

(f) in response to the actuator having only one branch, the deviation value for the one branch equals the actuator deviation value;

(g) comparing the actuator deviation values for each actuator to determine which of the plurality of actuators has the highest deviation value;

(h) in response to the actuator having the highest deviation value having only one branch, generating a signal indicating that the one branch has an increase leak in fluid consumption;

(i) in response to the actuator having a plurality of branches comparing the deviation values for the branches of the actuator with the highest deviation value to determine which branch has the highest deviation value; and (j) generating a signal indicating that the branch with the highest deviation value has an increase leak in fluid consumption.

2. The method as defined in claim 1, wherein the step of calculating the ΔFC value for each episode is calculated by mathematically differentiating the air consumption over the time duration of the episode.

3. The method as defined in claim 1, wherein after step (a) and before step (c) further includes the steps of;

calculating a current total air consumption value for a number of predetermined actuator movements or pressurization times;

comparing the current total air consumption value to a reference total air consumption value to obtain a difference value, whereby if the difference value exceeds a predetermined amount, then continue to step (c), if the difference value is less than a predetermined amount then go to step (a).

4. The method as defined in claim 1, wherein the step of calculating the ΔFC value for each episode is determined by calculating the slope value of a line plotting fluid consumption over time.

5. The method as defined in claim 4, wherein the slope value corresponding to each episode is calculated by obtaining an air consumption average Y1 over a first predetermined portion of a beginning of an episode and obtaining an air consumption average Y2 over a second predetermined portion of an end of the episode and dividing the difference between Y2 and Y1 by the total time of the episode.

6. The method as defined in claim 5, wherein the first and second predetermined portions are selectable by a user.

7. The method as defined in claim 5, wherein the first and second predetermined portions are determined by the monitoring device and are calculated as a percentage of a total length of the episode.

8. The method as defined in claim 1, further including the step: in response to a condition where all the deviation values for each branch and each actuator exceeds a predetermined value, generating a signal indicating that there is a leak in the supply line.

9. A method of diagnosing leakage in a fluid power system including a fluid supply line operatively connected to a plurality of valves which are connected to a plurality of actuators, the method comprising the steps of:

processing flow signals generated by a flow sensor disposed in the supply line to obtain fluid consumption over time;

processing signals used to change the state of the plurality of valves to determine a plurality of episodes, each of the plurality of episodes corresponding to a pressurization of a particular branch of a particular actuator;

combining the flow signals with the signals used to change the state of the valves to calculate a change in air consumption value, ΔFC, for each valve change of state;

comparing the ΔFC values for each episode to a predetermined reference value to determine a deviation value corresponding to a particular one of the plurality of episodes;

identifying the one of the plurality of episodes with the greatest deviation; and generating a signal indicating that a leak is present in the system and indicating the corresponding branch responsible for the leak.

10. A method of diagnosing leakage in a fluid power system including a fluid supply line operatively connected to a plurality of valves which are each connected to a corresponding actuator by a first and second fluid supply branch, the first and second branches of each actuator being selectively pressurized and exhausted by the corresponding valves, the method comprising the steps of:

defining a plurality of episodes wherein each episode corresponds to a time period when one of the first and second branches of one of the plurality of actuators is pressurized;

sensing the flow of fluid through the supply line to determine fluid consumption;

calculating a change in fluid consumption value ΔFC, for each episode to obtain a ΔFC value for each branch;

comparing the ΔFC value to a predetermined reference value for each of the branches of each of the plurality of actuators during a system cycle to obtain a deviation value for each of the first and second branches;

calculating the difference between the deviation value of the first and second branches to obtain an actuator deviation value;

comparing the actuator deviation values for each actuator to determine which of the plurality of actuators has the highest deviation value;

comparing the actuator deviation values for the first and second branches for the actuator with the highest actuator deviation value to identify which one of the first and second branches has the highest deviation value; and generating a signal indicating that the one of the first and second branches with the highest deviation value has a leak.

11. The method as defined in claim 10, further including the step of calculating the predetermined reference values for each of the episodes before calculating a ΔFC value for each episode.

12. The method as defined in claim 10, wherein the step of calculating the ΔFC value for each episode is determined by calculating the slope value of a line plotting fluid consumption over time.

13. The method as defined in claim 12, wherein the slope value corresponding to each episode is calculated by obtaining an air consumption average Y1 over a first predetermined portion of a beginning of an episode and obtaining an air consumption average Y2 over a second predetermined portion of an end of the episode and dividing the difference between Y2 and Y1 by the total time of the episode.

14. The method as defined in claim 13, wherein the first and second predetermined portions are selectable by a user.

15. The method as defined in claim 13, wherein the first and second predetermined portions are determined by the monitoring device and are calculated as a percentage of a total length of the episode.

16. A method of diagnosing leakage in a fluid power system including a fluid supply line operatively connected to a plurality of valves which are each connected to a corresponding actuator by a first and second branch, the first and second fluid supply branches of each actuator being selectively pressurized and exhausted by the corresponding valves, the method comprising the steps of:

monitoring the plurality of valves to determine which branch of each of the plurality of actuators is pressurized;

defining a plurality of episodes wherein each episode corresponds to a time period when one branch of one of the plurality of actuators is pressurized;

sensing the flow of fluid through the supply line to determine an amount of fluid consumed for each episode to form a flow consumption curve;

calculating an actual slope value for each branch from the flow consumption curve;

comparing the actual slope value to a predetermined reference slope value for each of the branches of each of the actuators during a system cycle and generating a deviation value for each of the branches;

calculating the difference between the deviation value of the first and second branches to obtain an actuator deviation value for each actuator;

comparing the actuator deviation values for each actuator to each other to determine the actuator with the highest actuator deviation value;

comparing the deviation values of the first and second branches of the actuator with the highest deviation value to determine which one of the first and second branches has the highest deviation value; and generating a signal indicating that the one of the first and second branches with the highest deviation value has a leak.

17. A method of diagnosing leakage in a fluid power system including a fluid supply line operatively connected to a plurality of valves which are each connected to a corresponding actuator by a first and second branch, the first and second branches of each actuator being selectively pressurized and depressurized by the corresponding valves, the method comprising the steps of:

(a) calculating an actual total fluid consumption value for a system cycle;

(b) comparing the actual total fluid consumption value to a predetermined reference total fluid consumption value, when the actual total fluid consumption value deviates a predetermined amount from the reference value then proceed to step (c), if the actual total fluid consumption value is deviated less than the predetermined amount from the reference value then return to step (a);

(c) defining a plurality of episodes wherein each episode corresponds to a time period when one branch of one of the plurality of actuators is pressurized;

(d) sensing the flow of fluid through the supply line to obtain fluid consumption values;

(e) calculating a fluid consumption value for each episode to obtain a fluid consumption value for each branch;

(f) comparing the fluid consumption value to a predetermined reference value for each of the branches of each of the plurality of actuators during a system cycle to obtain a deviation value for the first and second branch;

(g) calculating the difference between the deviation value of the first and second branches to obtain an actuator deviation value;

(h) comparing the actuator deviation values for each actuator to determine which of the plurality of actuators has the highest deviation value;

(i) comparing the deviation values for first and second branches for the actuator with the highest actuator deviation value to identify which branch has the highest fluid consumption value; and (j) generating a signal indicating that the identified branch with the highest fluid consumption value has a leak.

18. An apparatus for diagnosing leakage in a fluid power system including a fluid supply line operatively connected to a plurality of valves which are each connected to a corresponding actuator by a first and second branch, the first and second branches of each actuator being selectively pressurized and depressurized by the corresponding valves, the apparatus comprising:

a flow sensor disposed in the fluid supply line for sensing fluid flow to the plurality of valves;

a monitoring device operatively connected to the flow sensor, the monitoring device including a processor and memory;

a valve controller operatively connected to each of the plurality of valves and operatively connected to the monitoring device, the valve controller generating signals to cause the plurality of valves to shift state;

the monitoring device defining a plurality of episodes wherein each episode corresponds to a time period when one branch of one of the plurality of actuators is pressurized;

the monitoring device calculating a change in fluid consumption values, ΔFC, from signals received from the flow sensor;

the monitoring device calculates a ΔFC value for each episode to obtain a ΔFC value for each branch and compares the ΔFC value to a predetermined reference value for each of the branches of each of the plurality of actuators during a system cycle to obtain a deviation value for the first and second branch;

for each actuator, the monitoring device calculates the difference between the deviation value of the first and second branches to obtain an actuator deviation value, and compares the actuator deviation values for each actuator to determine which of the plurality of actuators has the highest deviation value;

for the actuator with the highest deviation value, the monitoring device compares the fluid consumption values for first and second branches to determine which branch has the highest fluid consumption value, and generates a signal indicating that the branch with the highest fluid consumption value has a leak.

19. The apparatus as defined in claim 18, wherein the monitoring device included a microprocessor.

20. The apparatus as defined in claim 19 wherein the microprocessor included memory for storing calculated values and an input device for receiving signals from the flow sensor and signals from the valve controller.

21. The apparatus as defined in claim 18, wherein the functions of the monitoring device and the functions of the valve controller are performed by a single processing unit.

* * * * *